E. C. WILSON.
SELF LOCKING COTTER PIN.
APPLICATION FILED JUNE 3, 1914.
1,308,018.
Patented June 24, 1919.
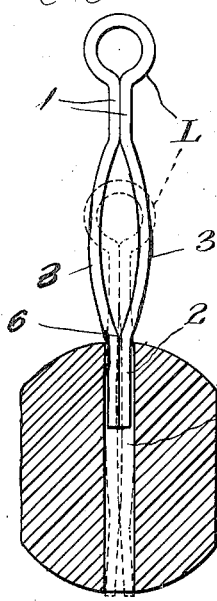
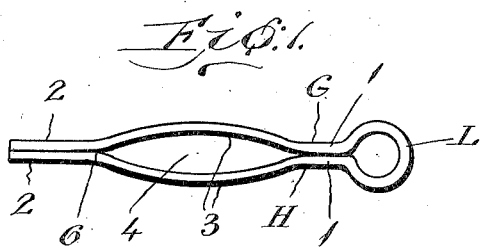
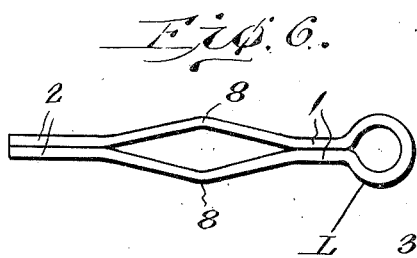
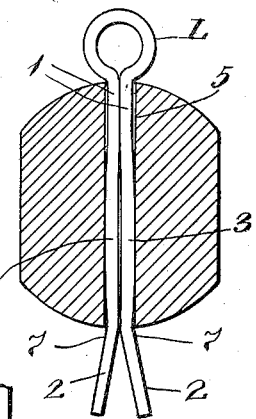
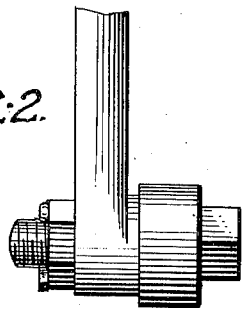
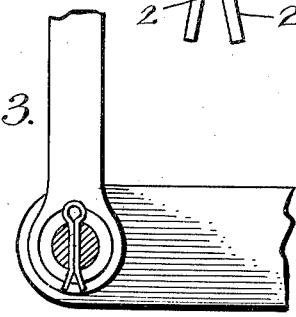
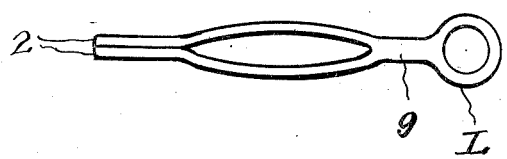
Witnesses
J. M. Fowler Jr.
L. Sanford Handie
Inventor
Edward C. Wilson
By Charles H. Wilson
Attorney

UNITED STATES PATENT OFFICE.

EDWARD C. WILSON, OF WASHINGTON, DISTRICT OF COLUMBIA.

SELF-LOCKING COTTER-PIN.

1,308,018.   Specification of Letters Patent.   Patented June 24, 1919.

Application filed June 3, 1914. Serial No. 842,638.

*To all whom it may concern:*

Be it known that I, EDWARD C. WILSON, residing at 2714 Ontario road, Washington, District of Columbia, have invented certain new and useful Improvements in Self-Locking Cotter-Pins, of which the following is a specification.

This invention relates to a self-locking cotter pin, and the object of the invention is to provide means whereby when the pin is driven into and through an opening, portions of the pin will be automatically caused to form shoulders and friction gripping parts for preventing the subsequent accidental detachment of the pin from the opening.

A more detailed object is to provide a cotter pin having its two legs bowed away from each other intermediate their length to comprise resilient friction parts which are necessarily forced toward each other as the pin enters an opening, and which thereby produces a powerful friction grip upon the inner surface of the walls of the opening, due to the tendency of the bowed portions to return toward their bowed position, the friction grip thus exerted serving to effectually retain the pin within the opening, and being in such direction against the walls of the opening, as to produce no tendency for the pin to creep outwardly.

A further detailed object is to provide portions of the legs of the pin, beyond the bowed portions thereof, normally straight to facilitate entrance into the opening, and this portion being adapted to spread apart into diverging relation beyond the outer end of the opening, owing to the pressing together of the bowed portions between the walls of the opening, and thereby to provide a shoulder portion positively preventing retrogressive movement of the pin.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a side elevation of a cotter pin constructed in accordance with the provisions of this invention.

Figs. 2 and 3 are views illustrating the use of this cotter pin.

Fig. 4 is a view illustrating, in full lines, the pin of Fig. 1 in position to be inserted within an opening in a shaft, bolt, or the like, and in dotted lines illustrating the pin as partly inserted within said opening.

Fig. 5 is a view similar to that shown in Fig. 4, but illustrating the pin in final locking position.

Figs. 6 and 7 illustrate modified constructions.

Referring to the structure illustrated in the drawings for a more detailed description thereof, the reference character L indicates the eye or head portion of the cotter pin, and the reference characters G and H indicate the leg portions or shank thereof. This cotter pin may be formed of any suitable material, but is preferably formed of the half-round soft iron wire common to such articles.

In forming the pin, the wire is bent upon itself to shape the eye L, and the ends are bent outwardly to form the legs G and H. These legs are formed with straight portions 1, at their inner ends, and with straight portions 2, at their outer ends. These straight portions are arranged in substantially parallel relation, and in contact, the straight portions of one leg with the straight portions of the other leg, and the straight portions 1 are substantially in longitudinal alinement with the straight portions 2.

Intermediate the portions 1 and 2 each of the legs is bowed outwardly, as at 3, leaving a suitable opening, as 4, between them. The connecting portions between the parts 2 and 3 and 1 and 3, preferably define decided angles for a purpose presently apparent.

In use the portions 2 are inserted within an opening 5 as shown by full lines as in Fig. 4, and the pin is then forced downwardly into said opening. In its movement into the opening, the bowed portions 3 are necessarily pressed together because of their contact with the walls of the opening, as shown by the dotted lines in Fig. 4. A very suitable pressure is thus caused to be exerted upon the walls of the opening, and sufficient friction generated to almost positively prevent accidental displacement of the pin, even though no other means is provided to prevent such displacement. As the parts 3 move toward each other, the outer ends of the parts 2 tend to move away from each other on a fulcrum at the point where the parts 2 connect with the parts 3, as at the point 6, in Fig. 1. As the parts 2 emerge from the outer side of the opening they naturally spread apart because of the resiliency of the metal, into the position substantially as indicated in Fig. 5, and thereby provide shoulder portions as 7, for engaging the outer end edges of the opening for positively preventing retrogressive movement of the pin.

It may be noted that the inner end portions of the parts 1, where said parts connect with the eye L, also tend to move away from each other in the same manner as described for the parts 2, but are prevented from thus moving because of their attachment to the eye. It is apparent, however, since these ends cannot move away from each other then the opposite or outer ends of the part 1 are given a tendency to move away from each other, because of the resiliency of the metal, and thereby the pressure against the walls of the opening is augmented. This is more apparent by inspection of Fig. 5, wherein it will be seen that if the lower ends of the part 2 be held together, then the portions 3 would be moved into tighter engagement with the walls of the opening. The parts 2 are the counter part of the parts one, except for the presence of the eye L.

In the structure Fig. 6, the bowed portions are shown with decided angles as 8, instead of the gradual rounding bows illustrated in Fig. 1.

In Fig. 7, the pin is shown as being constructed with a solid shank, as 9, and this, like the structure of Fig. 6, may be of advantage under certain conditions.

A pin constructed as above described may be manufactured at substantially the same cost as an ordinary pin, and the annoyance and the time wasted in spreading the ends is avoided.

It is not desired to limit the scope of protection herein wholly to the compressibility of the enlarged or bowed portions 3 as a means whereby the contact of said portions with the walls of an aperture will so affect said portions as to cause the locking ends 3 to move to locking position. Wherever, therefore, in the claims hereto appended a "means" is specified for accomplishing this result said "means" is intended to comprehend any expedient which may be employed in combination with the other elements recited in such claim or claims for producing the result.

As many changes could be made in this construction without departing from the scope of the following claims, it is intended that all matter contained in the above description or shown in the accompanying drawing shall be interpreted as illustrative only and not in a limiting sense.

Having thus described my invention, what I claim as new and desire to secure by Letters Patent is:

1. A cotter pin comprising a head part and a pair of legs extending from the head part, said legs having portions of their length adjacent said head arranged in close proximity to each other and in substantially parallel relation, said legs having portions of their length adjacent the outer ends thereof also arranged in close proximity to each other and in substantially parallel relation, said legs having portions of their length intermediate said mentioned portions bowed outwardly away from each other so as to comprise a compressible enlargement intermediate said mentioned end portions, the mentioned outer end portions being adapted to be spread apart to comprise locking means, and the compressible intermediate portion being adapted to be compressed to spread said outer end portions into locking position.

2. A cotter pin comprising a head part and a shank part, the shank part having a relatively enlarged portion intermediate its length and relatively reduced portions at the opposite ends of the relatively enlarged portion, one of said relatively reduced portions constituting an integral locking part, and the relatively enlarged portion providing means adapted to be affected by contact with the wall of an aperture into which the cotter pin may be inserted to cause the locking part to assume locking position.

3. A cotter pin comprising a head part and a pair of legs extending from the head part, said legs being shaped to provide a part of greatest width at a point intermediate their length and to provide a locking part at one end thereof beyond the point of greatest width, and said part of greatest width being compressible and being adapted to be compressed to move said locking part into locking position.

4. A cotter pin comprising a head portion, an outer end portion, and a portion intended to be positioned within an opening intermediate the ends of said opening, said last mentioned portion being resilient for frictionally engaging the walls of the opening at a point removed from either end of the opening, the outer end portion of the cotter pin comprising a locking part, and the resilient portion being compressible and being adapted to be compressed by contact with the walls of the opening to move the locking part to locking position.

5. A cotter pin comprising a head part and a pair of legs extending from the head part, said legs having portions of their length adjacent said head arranged in close proximity to each other, said legs having portions of their length adjacent the outer ends thereof also arranged in close proximity to each other and in substantially parallel relation, said legs having portions of their length intermediate said mentioned portions bowed outwardly away from each other so as to comprise a compressible enlargement intermediate said mentioned end portions, the mentioned outer end portions being adapted to be spread apart to comprise locking means, and the compressible intermediate portion being adapted to be compressed to spread said outer end portions into locking position.

6. A cotter pin having a head portion and a pair of legs extending from the head portion, said legs having their intermediate portions separated from each other and converging toward each other adjacent the head and adjacent their outer ends, and the outer end portions of the legs beyond the outer curved portions extending in parallel relation to each other.

7. A cotter pin comprising a head and a pair of legs extending therefrom, said legs being separated intermediate their length and being bent to form a relatively reduced neck portion adjacent the head, and the outer ends of the legs being disposed in parallel relation.

8. A cotter pin comprising a head and a pair of legs extending therefrom, said legs being separated intermediate their length and being bent to form a relatively reduced neck portion adjacent the head, the outer ends of the legs being disposed in parallel relation, and lying in engagement with each other.

9. A cotter pin comprising a strip of metal bent intermediate its ends to form a head, the portion of said strip forming said head having parts converging toward each other, the parts of said strip adjacent the converging parts being bent outwardly in divergent relation, the parts of said strip beyond the divergent parts being bent thence inwardly in converging relation, and the parts of said strip beyond said last converging parts extending for a distance in parallel relation to each other.

10. A cotter pin having opposite longitudinally and outwardly bowed portions, the high points of which are adapted to frictionally engage the walls of the bore in which the pin is located when the head of the pin is engaged with one end of the bore for the purpose of reducing to a minimum the area of contact between the pin and bore.

In testimony whereof I affix my signature in the presence of two witnesses.

EDWARD C. WILSON.

Witnesses:
E. E. RAMEY,
GEORGE G. TRAVERS.